(12) United States Patent
Kennedy

(10) Patent No.: US 6,706,406 B1
(45) Date of Patent: *Mar. 16, 2004

(54) COMPOSITE STEEL STRUCTURAL PLASTIC SANDWICH PLATE SYSTEMS

(75) Inventor: Stephen J. Kennedy, Ottawa (CA)

(73) Assignee: Fern Investments Limited, St. Helier, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/496,072

(22) Filed: Feb. 1, 2000

Related U.S. Application Data

(63) Continuation-in-part of application No. 09/053,551, filed on Apr. 1, 1998, now abandoned, which is a continuation of application No. 08/746,539, filed on Nov. 13, 1996, now Pat. No. 5,778,813.

(51) Int. Cl.⁷ .............................. B32B 15/08
(52) U.S. Cl. ............. 428/423.1; 428/308.4; 428/309.9; 428/457; 428/458
(58) Field of Search ............... 114/69, 74 A, 114/356, 357; 428/425.8, 306.6, 304.4, 307.3, 308.4, 457, 458, 332, 423.1

(56) References Cited

U.S. PATENT DOCUMENTS

| 5,030,488 A | * | 7/1991 | Sobolev | 428/35.9 |
|---|---|---|---|---|
| 6,050,208 A | | 4/2000 | Kennedy | 114/74 A |
| 6,630,249 B2 | * | 10/2003 | Kennedy | 428/625 |
| 2001/0035266 A1 | * | 11/2001 | Kennedy | 156/331.4 |
| 2002/0187320 A1 | * | 12/2002 | Kennedy | 428/209 |

FOREIGN PATENT DOCUMENTS

| GB | 1 221 134 A | 2/1971 | ............. B32B/3/28 |
|---|---|---|---|
| GB | 2 337 022 A | 11/1999 | ........... B32B/15/06 |

OTHER PUBLICATIONS

Patent status information for GB2337022, available at http://www.patent.gov.uk.*
In re Monk, 588 F.2d 308 (CCPA 1978).*

* cited by examiner

*Primary Examiner*—D. Lawrence Tarazano
(74) *Attorney, Agent, or Firm*—Darby & Darby

(57) ABSTRACT

A composite structural laminate plate suitable for building maritime vessels or for building civil structures such as double hull oil tankers, bulk carriers, barges decks for roll-on roll-off ferries, orthotropic bridge decks or for building any structural application in which the traditional method of construction uses stiffened steel plates. The laminate has two facing metal layers that are structurally bonded to a polyurethane elastomer core which may have steel or rigid foam void sections embedded within. The laminate provides equivalent inplane and transverse stiffness and strength, reduces fatigue problems, minimizes stress concentrations, improves thermal and acoustical insulation, and provides vibration control. The laminate provides a structural system that acts as a crack arrest layer and that can join two dissimilar metals without welding or without setting up a galvanic cell. For applications like double hull oil tankers, the structural system provides an impact resistant structure that isolates the innermost hull skin from cracks, thereby preventing a loss of cargo such as oil into the environment, when accidental or groundings occur and the outer hull is pierced, penetrated, or ruptured.

16 Claims, 8 Drawing Sheets

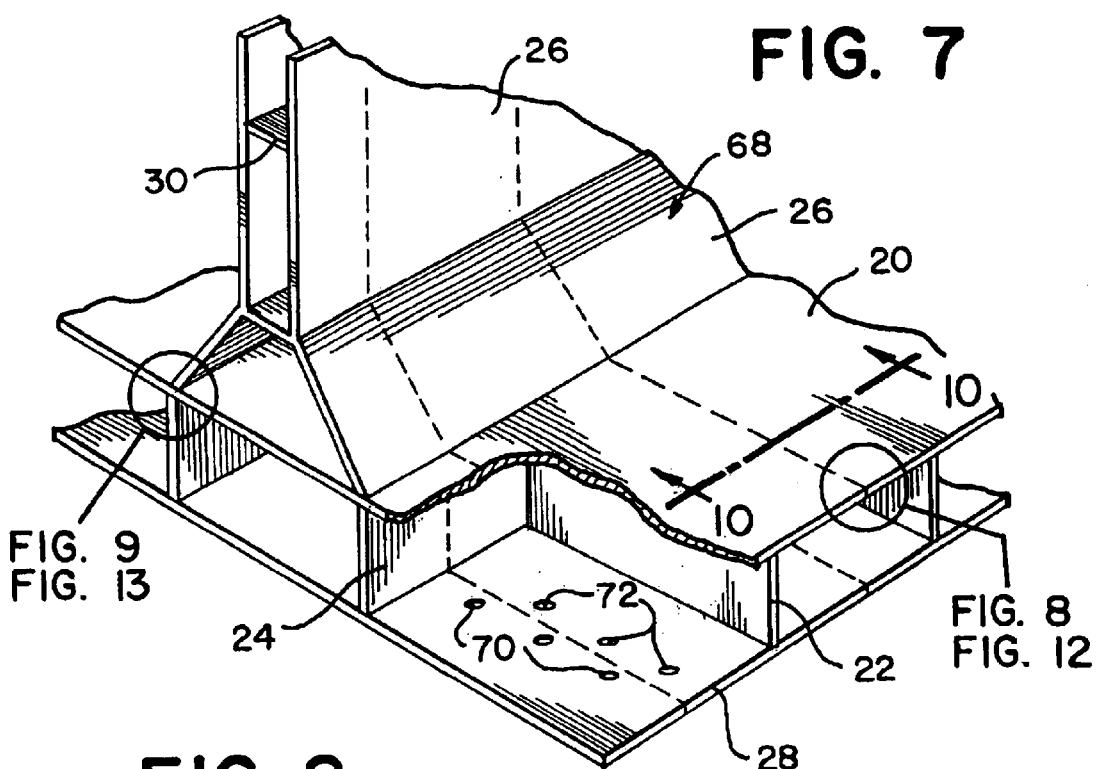
FIG. 7
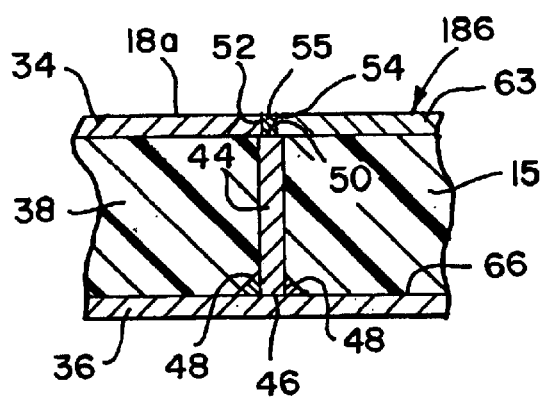
FIG. 8
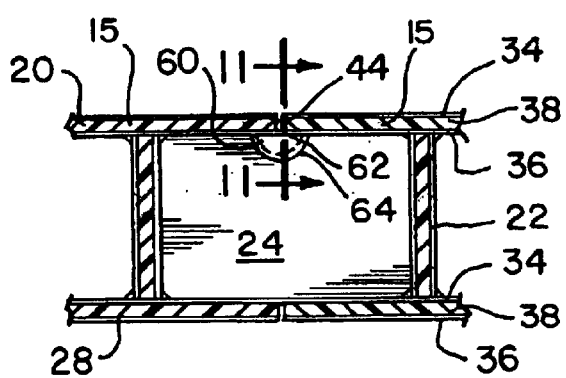
FIG. 10
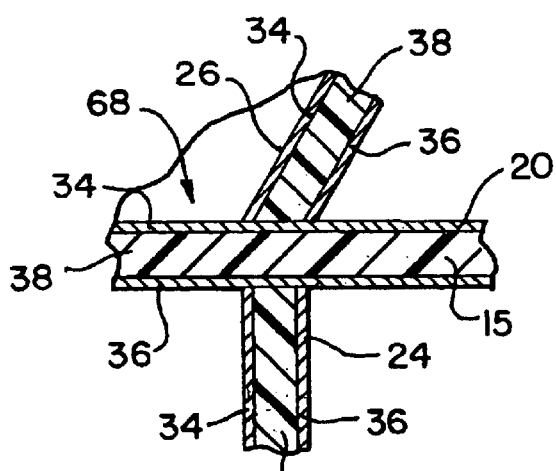
FIG. 9
FIG. 11

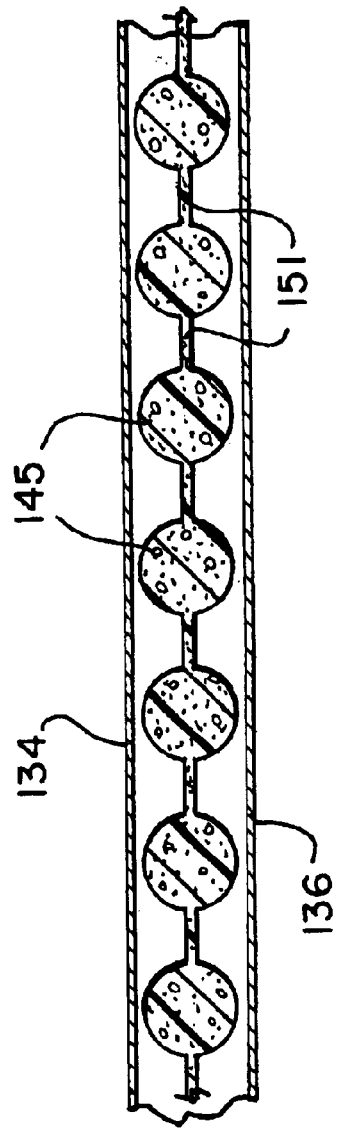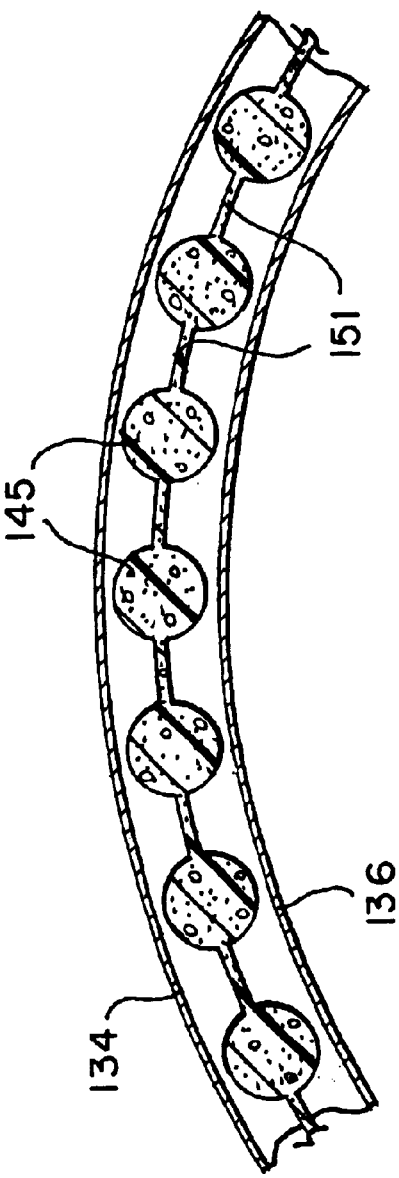

COMPOSITE STEEL STRUCTURAL PLASTIC SANDWICH PLATE SYSTEMS

This application is a continuation in part of Ser. No. 09/053,551 filed Apr. 4, 1998 now abandoned, which is a continuation of Ser. No. 08/746,539 filed Nov. 13, 1996 now U.S. Pat. No. 5,778,813.

FIELD OF THE INVENTION

The present invention relates to a flexible impact and tear resistant composite sandwich plate and construction system for vessels, such as, for example, tankers, bulk carriers or ships for which it is desirable to contain the vessel contents during conditions of extreme or accidental load or for which it is desirable to prevent failure (e.g., sinking of bulk carriers, ruptured members) or for which it is desirable to reduce costly repairs from fatigue cracks; and for civil or maritime structures, such as, for example, orthotropic bridge decks, railway bridges or tanks for which it is desirable to minimize strain concentration, reduce fatigue problems, improve thermal insulation and acoustical insulation or vibration characteristics, or where it is desirable to connect similar or dissimilar metals without welding.

DESCRIPTION OF THE PRIOR ART

Increased social, economic and political pressure has led to the development of technology to reduce or eliminate the risks of pollution and resulting damage to the marine environment, as well as the loss of valuable cargo, that may result from cargo leaking due to rupture of a vessel under extreme or accidental loads such as collisions, grounding, fire and explosion. In particular, vessels carrying hazardous materials are increasingly subject to additional requirements imposed by regulatory agencies, ship and cargo insurers, and ship owners and financiers. The high cost of hazardous spill liability and increasing cargo values has further encouraged the development of leak and rupture resistant vessels.

One approach to containing vessel contents is the provision of double hulls for oil tankers. An inner cargo containing hull of a stiffened single plate construction is supported within an outer protective hull, which is also a stiffened single plate construction. A conventional double hull has longitudinal and transverse frames between the inner and outer hulls. A more advanced, alternative double hull has only longitudinal frames between the inner and outer hulls, allowing for simplified construction suitable for assembly line production by robotic devices. Both conventional and advanced double hull designs have transverse bulkheads between cargo compartments in the inner hull, and may have bulkheads between ballast compartments which are generally located between the inner and outer hulls. Variations in double hull design include constructions with a double bottom only, or with a double bottom and double hull sides. To reduce weight, the deck is generally a single plate construction. Alternatively, convexly curved hull plates between longitudinal frames may provide high energy absorption in the curved plate double hull.

FIG. 1 shows a cross-section of a typical double hull oil tanker designed according to conventional naval architecture. FIG. 2 illustrates the arrangement of cargo tanks and other sections for a typical double hull vessel.

The advantages of double hull construction over conventional single hull designs are also well known. These advantages include improved cargo handling efficiency, better cargo purity, and reduced water pollution by isolating ballast tanks from cargo holds. Furthermore, double hulls constructed to international standards which require a two meter space between inner and outer hulls also offer reduced risk of leakage or rupture due to penetration of the outer hull during collisions or groundings. The claimed innovative features of advanced double hulls are improved strength, ease of manufacture and reduced welding and steel surface areas in ballast tanks, increased accessibility to ballast tanks which results in better inspection and improved maintenance and inner hull retention of oil during high energy grounding. With current technology, double hull vessels involved in low energy, low velocity impacts are less likely to be compromised and less likely to cause pollution than a single hull vessel. The improved tanker designs, such as double-bottom, double sides, double hull, mid-deck, etc. are known to reduce but not eliminate the risk of oil spills in accidents. Although tests indicate that an advanced all steel double hull design will dissipate more energy than a conventional all steel double hull design, both designs are subject to compromise of the inner hull due to crack propagation resulting from fatigue cracks or from cracks that propagate from a ruptured plate during extreme load events.

Patents related to improving the energy absorption capacity of double hull construction due to accidental or extreme load events such as grounding or collision include U.S. Pat. No. 5,218,919 to Krulikowski III et al. and U.S. Pat. No. 5,477,797 to Stuart. Both patents are directed to retrofitting existing single hull tankers with external hulls to make a double hull tanker. Krulikowski III et al. describe the use of energy absorbing telescoping members arranged in a truss-like formation to support a laminated steel auxiliary hull to the outside of an existing oil tanker hull. Construction details of attachments to transverse bulkheads and deflection control devices are also described. The void between hulls is filled with polyurethane foam/balls to distribute impact forces, to support the auxiliary hull under hydrostatic loads and to provide additional buoyancy in the case where the auxiliary hull is ruptured. Stuart describes the construction of an auxiliary hull attached to the outside hull of an existing oil tanker. It is composed of a series of longitudinally framed steel plates that form a honeycomb configuration, when viewed in section, between the hulls. The combination of stress relief joints, which make the outer hull discontinuous, and the honeycomb inner hull structure create a damage resistant hull. The construction also allows the inner hull space to be flooded to any level to provide the appropriate ballast by means of a pressurized inert gas and a vacuum pressure system. These retrofitted external hull structures fail to address the possibility of crack propagation into the inner hull due to rupture of the outer hull, and inadequately address the cost and practicality of fabrication and maintenance of the auxiliary hull structure. In current retrofit designs, access between the hulls for inspection and corrosion maintenance is difficult, if not impossible. The external hull in a retrofit design generally does not participate in carrying all of the operational loads, and adds significant dead weight to the tanker with limited structural functionality.

U.S. Pat. No. 4,083,318 to Verolme and U.S. Pat. No. 4,672,906 to Asai are directed to LNG (liquid natural gas) tankers and to tankers carrying cryogenic or high temperature freight in which the cargo tanks are separate structures from the tanker and do not form part of the load carrying hull girder system of the tanker.

Current all steel double hull construction has serious disadvantages which lower the likelihood that these design types will meet the performance criteria of zero oil outflow after accidental or extreme load events such as collisions, groundings, explosions or fire, and remain competitive relative to construction, maintenance and service life costs. One disadvantage is that current double hull construction is based on traditional naval architecture design concepts in conjunction with international agreements and national standards that stipulate the use of double hull construction with a minimum separation between hulls which is related to statistical data of measured rock penetrations from recorded tanker casualties.

Hulls constructed according to traditional naval architecture standards generally provide a complex system of steel plates and plate steel structural members, such as frames, bulkheads and girders. The carrying capacity of the steel plates and supporting members is increased by reinforcing the plates and structural members with multiple stiffeners of the type well known in the art, such as flat, angle or channel metal stock fastened to plate surfaces. This complex hull structure and plate stiffener system is a source of fatigue failures and a source for tearing (rupture) of the hull plate during accidental or extreme loads. This type of hull is costly to fabricate due to the large number of pieces which must be cut, handled and welded, and because of the significantly increased surface area on which protective coatings must be applied. Also, these typical complex structural systems are very congested, leading to poor access, poor inspection, poor and costly maintenance, and a decreased service life due to corrosion.

Recent large scale grounding tests on double hull sections also indicate that despite the superiority of double hull vessels over single hull vessels, rupture of the interior hull of currently available steel double hull designs may occur as a result of crack propagation from the initial rupture of the outside hull primarily at or near transverse structural members. The crack initiated in the outside hull propagates through the structural members between the inner and outer hulls and is transmitted to the inner hull. The obvious consequence of inner hull rupture will be oil outflow from each ruptured cargo hold. Providing a crack arrest layer or other structure to prevent the propagation of cracks through the steel structure into cargo tanks is not disclosed in current design alternatives. Therefore, preventing or reducing oil outflow in the event of accidental or extreme load events is not adequately addressed by currently available design alternatives.

A large scale composite steel polyurethane foam sandwich plate has been tested for its ability to prevent leak and rupture of a hull. These tests illustrate that polyurethane foam does not adequately adhere to the steel plates and has little shear strength. Low shear strength minimizes the flexural capacity of the composite and lack of adhesion precludes the possibility of using polyurethane foam and steel in a composite to increase the in-plane buckling capacity so that plate stiffeners can be eliminated. The low density foam used in the test composite had little or no tensile strength and insufficient compressive strength to be beneficial structurally. Generally, the tested foam acted as a crack arrest layer but did not function structurally. Therefore, the desired crack arresting structural composite configuration was not achieved. The tested foam possessed some energy absorption capacity; however, this capacity was small when compared to that of the steel in membrane action. The foam lessens the localized straining of the steel plates around a concentrated load point which delays, but does not prevent, the shear tension failure of the steel hull plates.

Structural and performance problems associated with hulls of product oil tankers are also applicable to many other civil and maritime structures. For example, orthotropic steel bridge decks have a reduced fatigue life due to the rupture of the welds that join the deck plate with the stiffening elements. These welds are subject to cyclic concentrated leads from traffic which cause large localized transverse stresses in the weld as the deck plate bends over the stiffening elements.

Thus, a need exists in the art for a hull construction system that simplifies the complexity of hull structure, reduces fabrication and maintenance costs, and increases energy absorption capacity and plastic behavior in the event of accidental or extreme loads to reduce or eliminate cargo loss due to hull rupture and crack propagation.

Thus, a need also exists in the art for steel construction of civil and maritime structures that simplifies construction, and improves structural performance and the life of the structure.

SUMMARY OF THE INVENTION

The above-described drawbacks inherent in the art for providing double hull tankers are advantageously eliminated in accordance with the teachings of the present invention by bonding a tough structural elastomer between steel plates to form steel-elastomer-steel composite hull panels, frames and supporting members. The elastomer is preferably hydrophobic to prevent water absorption which could lead to rusting of the plates and should have sufficient ductility to exceed the yield strain of the steel plates without rupturing. The composite panels are used in constructing at least the inner hull of the double hull. Preferably the steel-elastomer-steel composite panels are used to construct the inner hull, outer hull, bulkheads, floors, decks and collapsible frame and support members and may be formed in any necessary shape. The elastomer layer within the composite panels forming the inner hull particularly provides an effective crack arrest layer between the inner steel plate of the inner hull and the outer steel plate of the inner hull, which effectively isolates the inner steel plate of the inner hull from cracks that propagate from the outer hull, the transverse members, such as floor frames and bulkheads, and other supporting elements, such as web frames and horizontal frames, that are designed for both in-service loads and for accidental or extreme loads. Furthermore, because the composite panels are stronger and stiffer than conventional steel plates, the number of framing and supporting elements can be significantly reduced while meeting or exceeding current design standards for strength, service life, construction cost, maintenance cost and survivability. Furthermore, the composite panels may be modified to include voids within the core to lighten the structure or to enhance performance. The shapes, location pattern and orientation of these voids may be optimized to provide the required performance for the particular structure. The voids may be formed with prefabricated rigid foam forms or with forms constructed of light gauge steel or of other materials that are suited to the structure and compatible with the elastomer. Structural shapes or plates may be incorporated to enhance shear stiffness. The connection and shear transfer between these structured shapes and the face plates is in one embodiment provided by bonding the polyurethane elastomer core material to both the structured shape and the face plates without welding. Structural bonding of the face plates or of the face plates and internal structural shapes or plates may be sufficient to provide adequate shear transfer and eliminate the need for welding between metal parts or surfaces. This attribute is particularly advantageous when dissimilar metals are required to be used for the face plates.

In accordance with the teachings of the present invention, a composite steel polyurethane elastomer Sandwich Plate System ("SPS") with or without voids and with properly detailed floor and transverse bulkheads is particularly suited for use in containment vessels such as, for example, oil tankers, or for other civil or maritime structures, such as, for example, orthotropic bridge decks or other traditionally stiffened steel plate structures. These vessels or structures can be fabricated to substantially eliminate the drawbacks associated with known all steel vessels or structures. The specific details relating to ship design may be found in American Bureau of Shipping and Affiliated Companies, 1996 Part 3, Hull Construction and Equipment; Part 5, Specialized Vessels and Services, which is incorporated herein by reference.

BRIEF DESCRIPTION OF THE DRAWINGS

The teachings of the present invention can be readily understood by considering the following detailed description in conjunction with the accompanying drawing in which:

FIG. 7 is a cutaway cross section view of a crack arrest detail for a transverse bulkhead according to the present invention;

FIG. 8 is a cross-section view of composite panel constructed according to the present invention;

FIG. 9 is a cross-section view of the inner hull and bulkhead constructed with composite panels according to the present invention;

FIG. 10 is a cross-section view of the inner and outer hull and supporting members constructed with composite panels according to the present invention;

FIG. 11 is a cross-section view taken along line 11—11 in FIG. 10, showing details of the elastomer plug sealing the crack arrest cut-out;

FIG. 16 is a partial sectional view of a planar sandwich plate system;

FIG. 17 is a partial sectional view of a curvilinear sandwich plate system;

DETAILED DESCRIPTION

The teachings of the present invention are applicable to any structure, vessel, tanker, bulk carrier or ship in which it is desired to contain the contents during an extreme or accidental load event or where it is desirable to enhance fatigue life, improve thermal insulation, improve acoustical insulation, improve dampening characteristics to control vibrations or to connect similar or dissimilar metals without welding.

The connection of dissimilar metals is especially relevant in storage tanks where vegetable oils, palm oils or other edible oils must be stored without contamination or where corrosive materials must be stored. Generally, metal liners like stainless steel are used as these liners. These speciality metals tend to be substantially more expensive than the support structure. Connecting or welding dissimilar metals involves complicated and costly procedures like explosion bonding, which may not be applicable to or suitable for joining thin plates. Additionally, both the stainless steel liner and outer shell or support structure may require its own stiffening to obtain the required structural strength.

By using the teachings of the present invention, no stiffeners are required and the connection between dissimilar metals is solved by bonding the core material to each metal liner. The construction also allows a redistribution of steel so that thin gauge stainless steel can be used in conjunction with thicker, less expensive structural steel. The construction also allows a redistribution of steel so that thin gauge stainless can be used in conjunction with thicker, less expensive structural steel.

For the sake of illustration only, the present invention will be discussed in the context of double hull oil tankers. Those skilled in the art will readily appreciate how the teachings of the present invention can be incorporated into the structural configuration of other vessels, bulk carriers, etc., such as, road vehicles, rail cars and storage tanks, or other stiffened plate structures like bridge decks.

Figure 1:
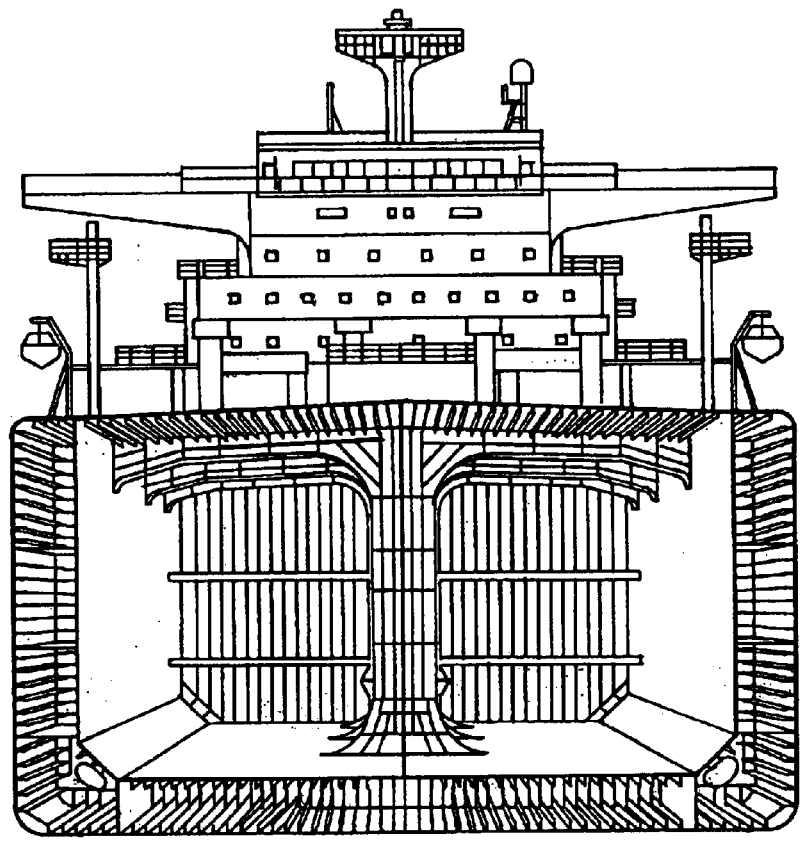
FIG. 1 is a perspective cross-sectional view of a prior art all-steel double hull oil tanker which includes a unidirectional girder system and stiffened steel hull plates.
Figure 2:
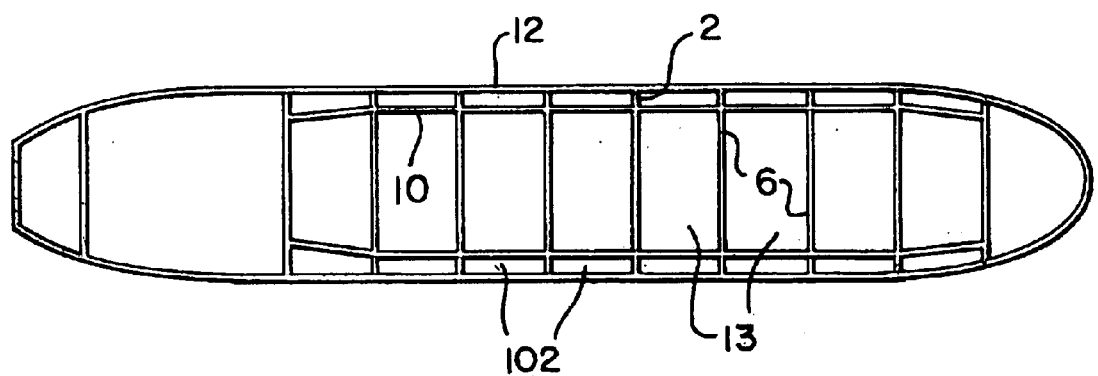
FIG. 2 is a plan view of a prior art double hull tanker illustrating the general arrangement of cargo and ballast compartments.
Figure 3:
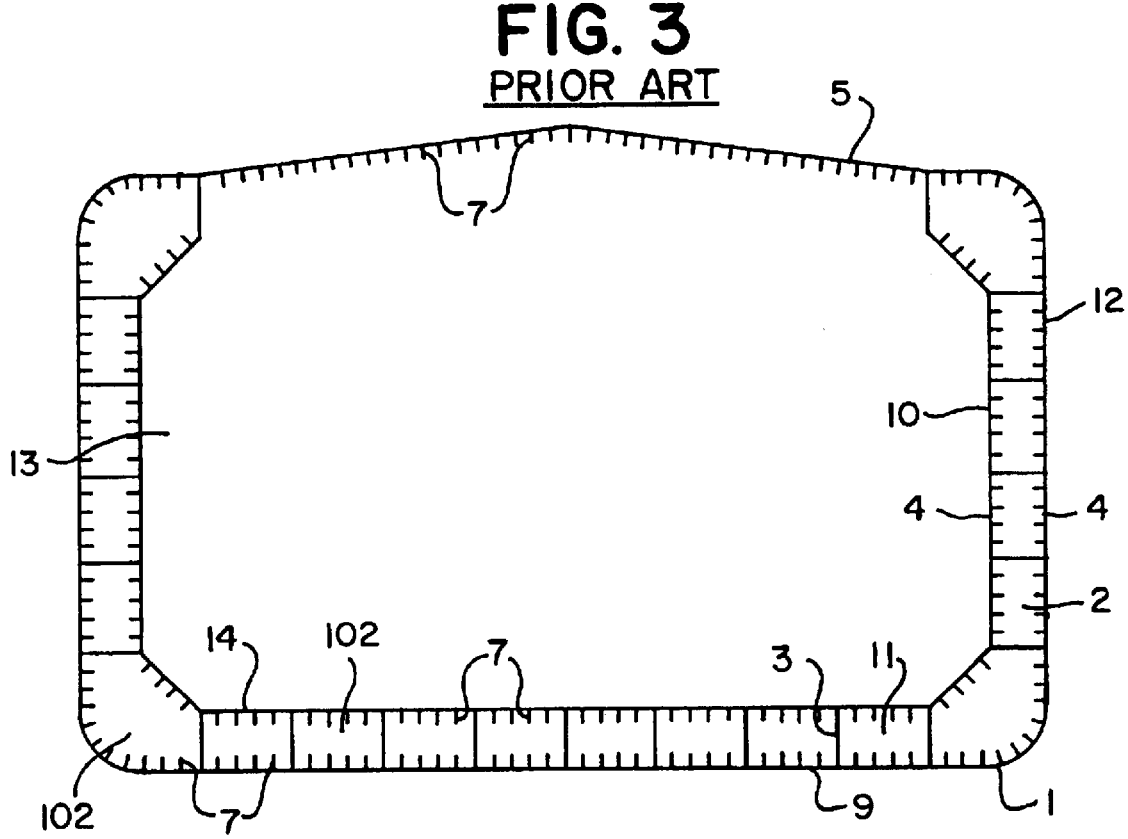
FIG. 3 is a cross-sectional view of a prior art double hull tanker midsection taken at a transverse bulkhead illustrating the structural members and stiffener system.

In existing designs, research, rules and regulations and construction for impact resistance and survivability have generally been directed to all-steel conventional double hulls and advanced double hulls, also known as unidirectional stiffened girder double hulls. A typical conventional double hull (CDH) design as illustrated in FIGS. 2 and 3, for example, for a 40,000 DWT (deadweight tons) tanker is characterized by an inner hull 10 and an outer hull 12, with an. orthogonally stiffened bottom 1, transverse web frames 2 and longitudinal girders 3. Hull plates 4 are welded or otherwise attached to the longitudinal girders 3. Web frames 2, oriented transversely to the longitudinal girders 3, are attached between longitudinal girders 3 to retain and stabilize the girders 3. The plan view of FIG. 2 illustrates a typical layout for a tanker having an outer hull 12 and an inner hull 10 in the cargo containing portion of outer hull 12. The compartmentalized cargo holds 13 in the inner hull 10 are separated by bulkheads 6. Compartments 102, outboard from the cargo holds 13, may serve as ballast tanks in the lower part of the hull.

Typically, the load carrying capacity of the hull and deck plates 4 and 5, respectively, and the web and floor frames 2 and 11, respectively, bulkheads 6 and girders 3 are increased by the addition of stiffeners 7, as shown in FIG. 3. Numerous stiffeners 7 are required to strengthen hull plates 4 of both the inner and outer hulls 10, 12 and deck plates 5. Additional stiffeners, not shown, are also found on girders 3, bulkheads 6, frames 2 and girders 3. It is recognized that this type of construction may not be designed to be impact resistant for accidental or extreme load events such as groundings and collisions. An advanced double hull (ADH) system has primarily longitudinal unidirectional framing between outer and inner hulls. The advanced double hull has significantly fewer transverse members, but the advanced double hull does have transverse bulkheads 6 between cargo compartments 13, and may have transverse floor frames 11 between ballast compartments 102 located between the inner and outer hulls. Like conventional double hulls, the carrying capacity of advanced double hull steel plate components is enhanced by fixing numerous stiffeners 7 to the surface of the plate steel components.

Recent studies of the effect of high energy impact grounding on both conventional and advanced all steel double hull construction systems demonstrates that the outer hull 12 will generally rupture longitudinally as a result of exceeding the maximum strain in membrane action of the steel plate 9 between longitudinal girders 3, and that rupture of the inner hull 10 is initiated by vertical crack propagation from transverse frames 2, 11 and bulkheads 6. This in turn is initiated by the rupture of the outer hull 12 at or near transverse members 2, 6, 11, such as, bulkheads 6, floors 11 or frames 2. On the intrusion of a foreign object into the vessel's hull, a portion of the inner hull 10 is pushed inward ("lifted") either by direct contact with the intruding object, or indirectly by support members, such as, for example, a hull girder 3, or floor frame 11 which is pushed inward by the intruding object. The inner hull plates 14 in the impact area may deform as a membrane until a transverse member 11 restrains the inner hull 10 from further inward movement, e.g., "lift" of the inner hull plate 14 is restrained, causing extreme membrane stresses at or near the location of the intruding object. The extreme membrane stress triggers an initial crack, either in the transverse member 2, 6, 11 restraining the inner hull plate 14, or directly in the restrained inner hull plate 14, leading to inner hull 10 rupture. It is generally required that a spill proof tanker bottom structure must be designed to allow "lift" and inelastic membrane deformation of the inner hull 10 without rupture.

To achieve this purpose, in accordance with the present invention, a crack arrest layer 15 (FIG. 4) is incorporated in the hull structure at least at or near all transverse members, such as for example floor frames 24 and bulkheads 26, but preferably throughout the entire hull structure, wherever practical.

In the discussions herein for purposes of orientation, when "inner" is used with respect to components, it will generally refer to components relatively closer to the cargo hold of the vessel. When "inner" is used with respect to a surface, it will generally refer to a surface facing the cargo hold. In particular, the inner surface 63 (FIG. 8) of the inner metal plate or layer 34 of the inner hull 20 faces and is generally exposed to the cargo hold 68. When "outer" is used with respect to components, it will generally refer to components relatively further from the cargo hold. When "outer" is used with respect to a surface, it will generally refer to a surface facing away from the cargo hold.

Figure 4:
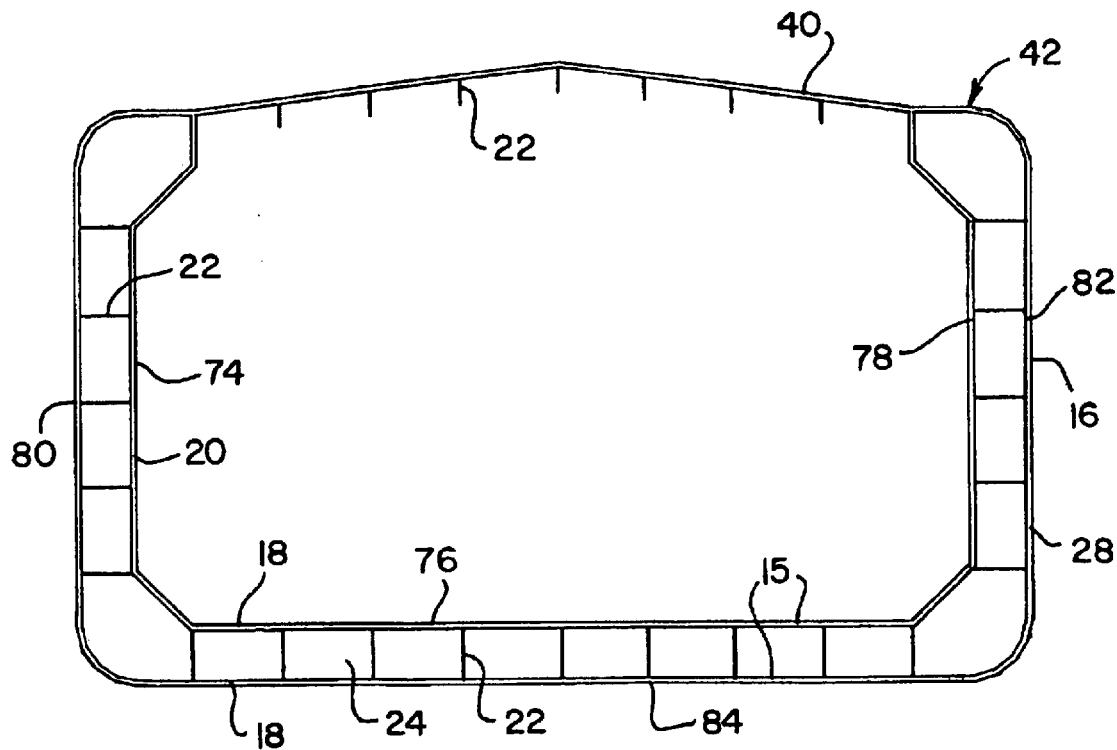
FIG. 4 is a cross-sectional view of a double hull midsection taken at a transverse bulkhead constructed with composite panels according to the present invention.
Figure 5:
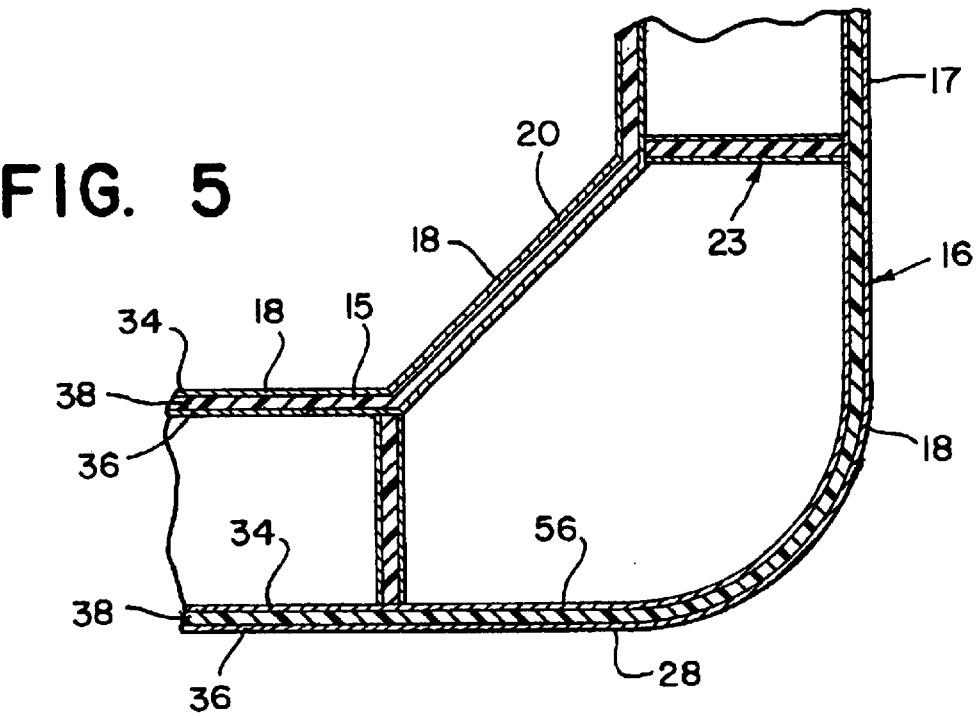
FIG. 5 is a partial cross-section view of a cargo hold of a double hull vessel constructed with composite panels according to the present invention.

Referring now to FIG. 4 which illustrates the present invention, a composite panel vessel construction system for building, for example, a tanker constructed with a unidirectional double hull sandwich plate system ("UDH SPS"), incorporates a tough impact resistant hull 16 composed of steel-elastomer-steel composite panels 18 supported by a properly detailed collapsible structure, some or all of which may also be of composite panel construction. Referring now to FIG. 5, the composite panels 18 are comprised of an inner metal plate 34 spaced apart from and facing an outer metal plate 36, the inner and outer metal plates being bonded to an intermediate elastomer core 38. An inner hull having two opposite sides 74 and 78, and a bottom 76, forms a cargo hold 68. A deck 40 extends from the top of side 74 to the top of side 78 to close the top of the cargo hold 68. A bulkhead 26 at each end of the cargo hold 68 is connected to the sides 74 and 78, and the bottom 76 and deck 40, to substantially completely enclose cargo hold 68. An outer hull 28 having two sides 80 and 82 and a bottom 84, is spaced apart from and encloses, respectively, the two sides 74 and 78 and bottom 76 of inner hull 20. The outer hull 28 is connected to the inner hull 20 by support members including longitudinal girders 22 and transverse floor frames 24. At least the inner hull 20 is constructed of composite panels 18. Preferably, the inner hull 20, outer hull 28, longitudinal girders 22, floor frames 24 and bulkheads 26 are constructed of composite panels 18. The various components, whether made of composite panels 18 or of conventional single plate steel are connected together by welding or by other conventional means, with certain allowances, discussed below, necessary to accommodate the elastomer core 38 of the composite panel 18.

The UDH SPS will significantly enhance survivability of the inner cargo containing hull 20 in the event of a collision or grounding, and significantly reduces, if not eliminates, the outflow of oil during such an event, particularly in comparison to conventional double hull counterparts. The UDH SPS is constructed to behave in a ductile mode under accidental or extreme loads and to absorb the energy through inelastic membrane action of the composite panel hull and plastic deformation of conventional steel and/or steel-elastomer-steel composite panel supporting elements. To minimize or eliminate oil outflow, cargo hold crack or tear propagation is prevented. To prevent tearing or cracking as a mode of failure during extreme load events, absorption and dissipation of the impact energy is maximized by engaging as much of the ship as possible in the collision or grounding. In doing so, the consequence of oil outflow is minimized, if not eliminated altogether.

Insofar as oil tankers are concerned, the UDH SPS can be designed to provide equivalent or greater strength for operational loads than existing conventional or advanced all-steel double hull vessels designed according to current standards. As shown in cross-sectional detail in FIG. 5, the steel-elastomer-steel hull girder 22 according to the present invention has an inner metal plate 34 and an outer metal plate 36 on an elastomer core 38 to provide sufficient bending, shear and torsional strength to act as a hollow thin-walled box beam capable of withstanding typical or extreme static and dynamic loads such as those associated with operating a cargo vessel. These loads include for example, still water loads, dry docking loads, thermal loads, wave-induced dynamic pressure distributions on the hull, sloshing of liquid cargoes, green-seas on the deck, wave slap, inertia loads, launching and berthing loads, ice breaking loads, slamming, forced vibration, collision and grounding.

Figure 6:
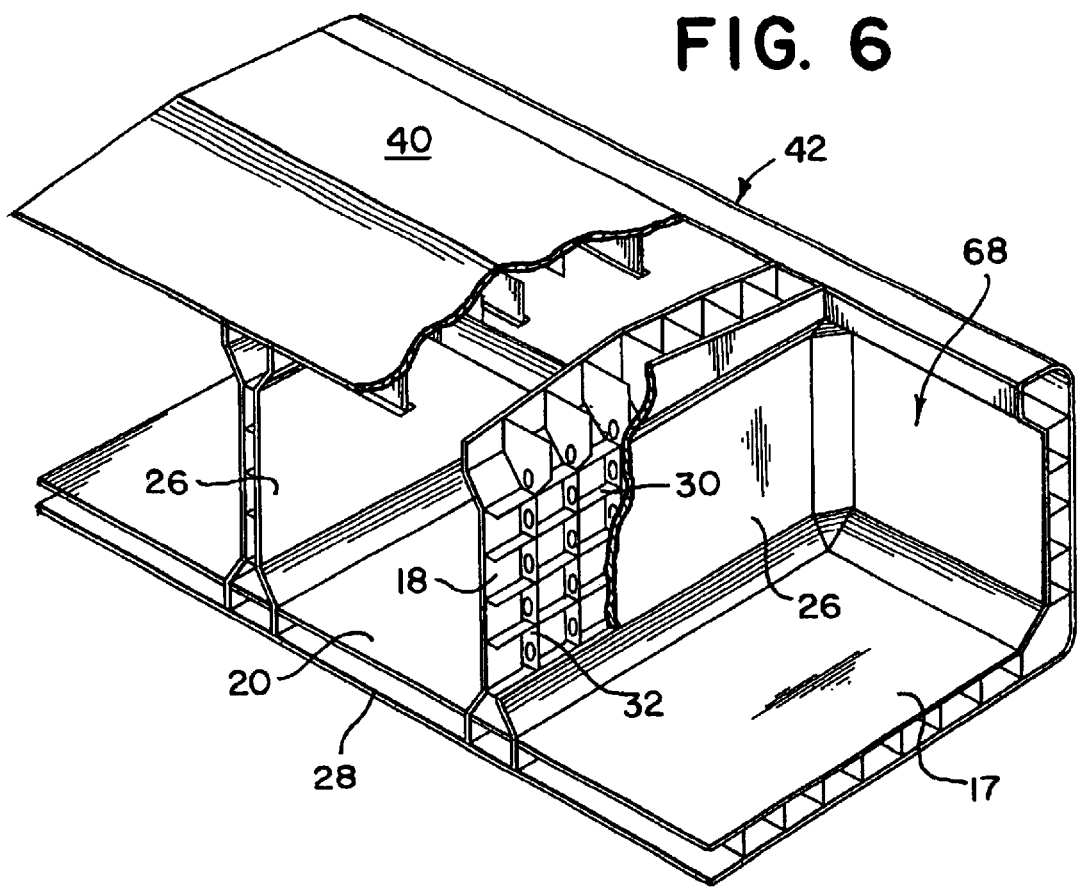
FIG. 6 is a cutaway cross-section view of a double hull vessel transverse bulkhead construction with composite panels according to the present invention.

FIGS. 4 and 6 illustrate a double hull midship section 42 and transverse bulkhead 26 for a double hull tanker constructed with composite steel-elastomer-steel panels 18.

Both the inner and outer hulls 20 and 28, respectively, are constructed from composite steel-elastomer-steel panels 18 suitably designed and dimensioned for a vessel of a particular size and purpose. The transverse bulkheads 26 shown in FIGS. 6, 7 and 9 are also constructed of composite steel-elastomer-steel panels 18 supported by both horizontal and vertical web plates 30 and 32 respectively, which may also be of composite panel 18 construction.

Figure 12:
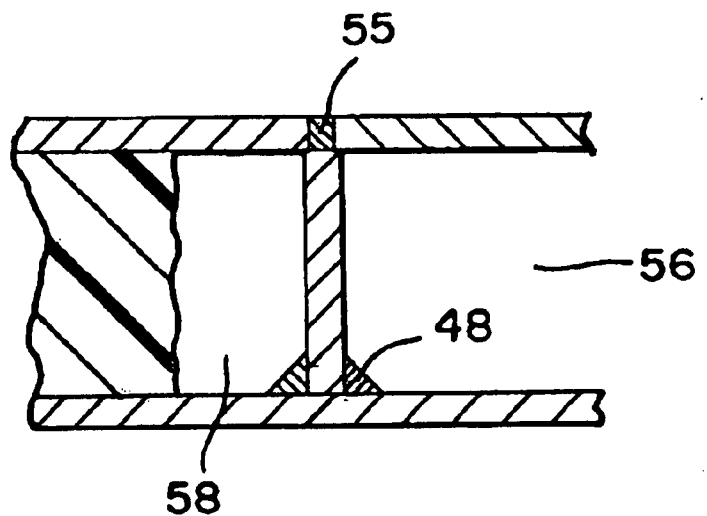
FIG. 12 is a cross-section view of a composite panel under construction according to the present invention.

The composite panels 18 can be manufactured as individual components, such as, for example, hull panels 17, floor frames 24, girders 22, bulkheads 26, etc., which can subsequently be shipped or assembled into sub-assemblies of a complete vessel, in a number of different ways. The inner and outer metal plates 34 and 36 (FIG. 5) of a composite panel 18 are positioned in an appropriate spaced apart relationship to form a cavity 56 (FIG. 12) for the elastomer core 38. In the preferred embodiment, the inner and outer metal plates 34 and 36 respectively, are steel. Other suitable metals may be used, such as for example, stainless steel for high corrosion applications, or to reduce contamination of edible oils or aluminum for light weight applications. Because the composite panels 18 are significantly stronger than single plate metal, other softer types of metal may be used to construct composite panels.

As shown in FIG. 8, preferably the appropriate spacing between the inner and outer metal layers 34 and 36 is maintained by spacer elements 44 ("spacers") provided between the inner and outer metal layers 34 and 36. The spacer element 44 may comprise a continuous strip-like member, or alternatively the spacer element 44 can comprise multiple individual spacer members arranged randomly or in a pattern. The spacers 44 can be made of metal or any other suitable material that is placed between the metal inner and outer layers 34 and 36. The spacer elements 44 may be welded or bonded to the inner and/or outer metal layer 34 and 36. Preferably, the spacers 44 are continuous strip-like members having opposite longitudinal edges 46 and 50. The spacers 44 are welded on one longitudinal edge 46 with fillet welds 48 to the outer metal plate 36 at points along the mid-line of the plate 36 and generally mid-way between longitudinal girders 22. Preferably the spacers run generally only in the longitudinal direction with respect to the hull construction, but may also run in a transverse direction where necessary. The inner metal plates 34 which have substantially the same length and width dimensions as the outer metal plates 36, are laterally staggered, so that the edges 52 and 54 of the abutting inner plates 18*a* and 18*b* fall naturally on the spacer edge 50. The edge 50 of the spacer 44 may serve as a support for adjacent edges 52 and 54 of abutting panels 18*a* and 18*b*. The spacer element edge 50 acts as a weld backing bar, supporting the inner metal layer plates 18*a* and 18*b* until butt weld 55 is completed. The spacer element 44 acting as a backing bar also helps to establish a proper weld gap and minimizes weld preparation. The butt weld 55 securely fastens the edges 52 and 54 of panels 18*a* and 18*b* to the edge 50 of spacer 44. The elastomer core 38 may be added subsequent to welding of the plates 18*a* and 18*b* through apertures 70 in the inner or outer metal plates 34 and 36, respectively.

Figure 18:
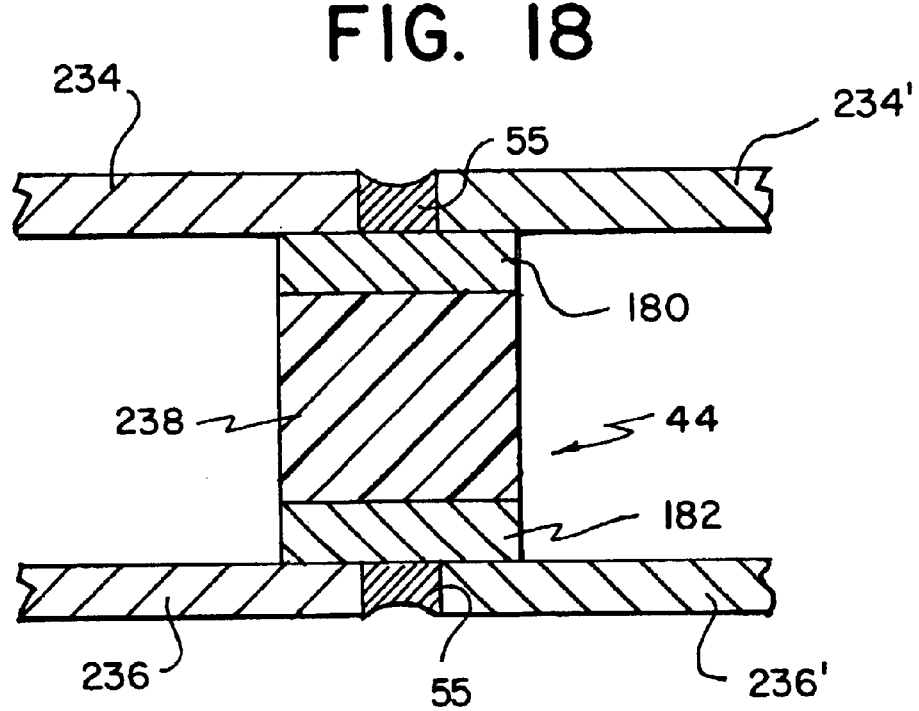
FIG. 18 is a partial sectional view of another embodiment of a sandwich plate system.
Figure 19:
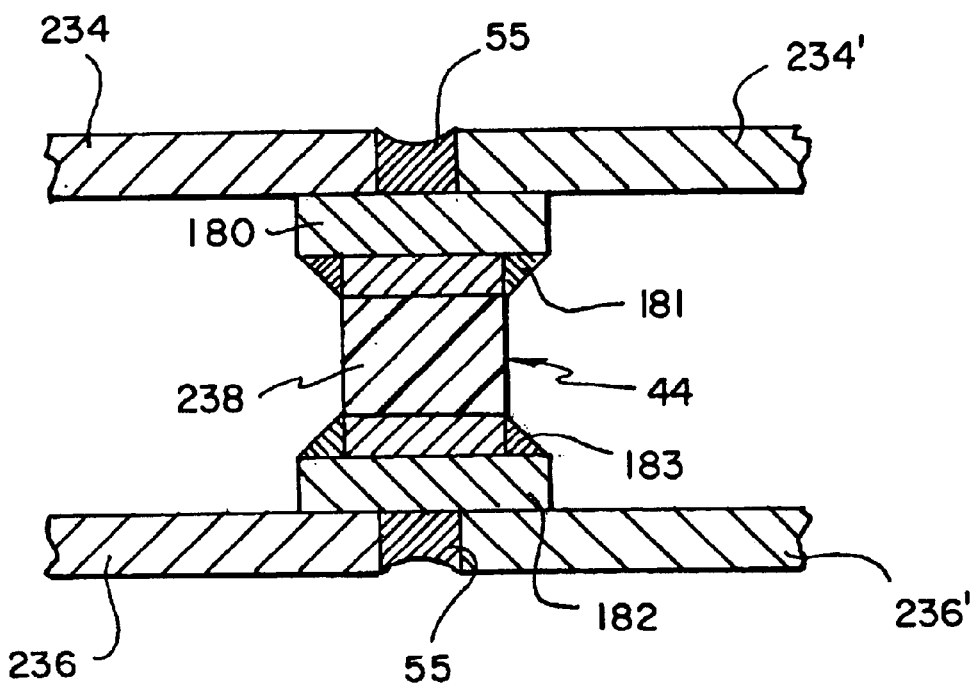
FIG. 19 is a partial sectional view of yet another embodiment of a sandwich plate system.

Referring now to FIG. 18, alternatively, spacer element 44 may be constructed of an elastomer core 238 bonded to two dissimilar metal backing bars 180, 182. Thus, face plates 234, 234 can be welded to backing bar 180 by butt welds 55. The backing bars 180, 182 are made of weld metal that is compatible with the parent face plate that it is joined to. The backing bars 180, 182 are preferably sufficiently thick to prevent degradation of the elastomer core 238 during the butt welding process. Alternatively, as illustrated in FIG. 19, an additional backing bar plate 181, 183 can initially be welded to backing bars 180, 182, respectively, to prevent later degradation of the elastomer core 238 when butt welding the face plates to the backing bars.

The spacer elements 44 may alternatively be premanufactured of precast elastomer strips or blocks, bonded or thermoset into position between the metal layers 34 and 36. Alternatively, the spacing may be maintained by, for example, a manufacturing jig which holds the inner and outer plate, 34 and 36 respectively, in a spaced apart relationship to form core cavity 56 until the elastomer core 38 is provided and cured.

Preferably, the individual components, such as the longitudinal girders 22, floor frames 24, bulkheads 26, inner and outer hull 20 and 28 and composite hull panels 18 are integrally manufactured on a vessel under construction by at least partially fastening the inner and outer steel plates 34 and 36 of a particular component at the designated location for that component, while maintaining a suitable core cavity 56 between the plates of the component. The elastomer is subsequently placed in the core cavity between the inner and outer metal plates 34 and 36 by flowing or injecting it in a liquid or viscous state, and allowing or causing the elastomer to cast in place in the core cavity. The elastomer can alternatively be placed in the core through a tube or tubes cross-sectionally dimensioned to enter the empty core cavity at an open or unfastened edge of the component, the tubes being of a length suitable to enter the dimensions of the component. As elastomer enters through the tubes into the cavity to fill the void between the plates, the tubes are withdrawn. The elastomer takes on the form of the void, in this case the core cavity 56, in which it is cast. Alternatively, the elastomer can be placed in the core cavity by injection or flowing through plate apertures or ports 70 (FIG. 7) provided in the inner or outer metal plates 34 and 36. The preferred location of the plate apertures 70 are on the inner metal plate 34 of the outer hull 28 and the outer metal plate 36 of the inner hull 20, away from exposure to the outside environment and away from exposure to the cargo. These plate apertures 70 are then sealed with threaded metal plugs 72, rivet type plugs or press fit plugs or glued plugs. Glued plugs are adhered with adhesive that has melting temperatures similar to the core material which is generally in the range of 250° C. to 300° C. The minimum melt temperature should not be less than 200° C. The elastomer can be placed in the core cavity 56 of individual construction components as construction of the hull progresses, or large sections or an entire hull can be constructed with an empty core cavity 56 between inner and outer plates 34 and 36, and elastomer can subsequently be placed in the core cavity 56. Once the flowable elastomer is in the core cavity 56, the elastomer core 38 is cured by, for example, applying heat.

The preferred thickness of each of the inner and outer steel layers 34 and 36 ranges from, for example, generally 0.2 mm to 30 mm, preferably from 3.5 mm to 25 mm and more preferably from 4.0 mm to 20 mm, with 10 mm considered an ideal thickness. These dimensions will change with service or component requirements, and with changes in the type or quality of the materials employed. For example, one metal layer could be used as a lining in a corrosion or contaminant free liner. Thus, this lining could be very thin gauge steel (e.g., 0.2 mm). It will be appreciated by those familiar with the art that the inner and outer metal layers 34 and 36 need not have identical thickness dimensions and need not be made of the same type or quality of metal. Numerous combinations and variations are possible without deviating from the spirit or scope of the invention.

The dimensional thickness of the composite panel can be selectively adjusted during assembly of the laminate to achieve desired structural strength requirements for various components and applications. The dimensional thickness of each of the inner and outer metal plates 34 and 36 and/or the elastomer core 38 can be varied according to a particular requirement. Furthermore, the laminate panels 18 can be constructed to have dimensionally thickened panel portions for localized adjustment of structural strength. The dimensionally thickened portion of a panel can be the result of a thickened elastomer core 38 provided by varying spacer element 44 dimensions such as, by varying the depth of the spacer element along the length of the spacer element, providing composite panels 18 with variable thickness. Alternatively, the dimensionally thickened panel can result from thickening of one or both of the metal inner and outer plates 34 and 36 of the composite.

The elastomer is preferably a thermosetting type of plastic, which may require heat to cure the material and complete the casting process. The preferred polyurethane elastomers cure at temperatures of approximately 0° C.–60° C. Residual heat from the welding of components will provide a portion of the casting heat, particularly near the weld joints. However, portions of the core cavity 56 that are remote from the weld joints will require application of supplemental curing heat. The heat necessary to cure the elastomer core 38 can be provided to the inner and outer metal plates 34 and 36 of the composite panel 18. The metal plates 34 and 36 will readily transmit the heat to the elastomer 38 in the core cavity 56 to complete casting of the elastomer. Alternatively, an elastomer can be selected that flows at reduced or elevated temperatures, and cures at ambient temperatures. The exthothermic reaction from the elastomer may produce sufficient heat to cure it.

After the core cavity 56 is filled with elastomer 38, any apertures 70 in the inner and outer metal plates 34 and 36 are sealed with threaded, rivet type or pressure fit metal plugs 72. The apertures may also be sealed by casting into the apertures liquid metal having suitable melting points similar to the core material which is generally in the range of 250° C. to 300° C. The minimum melt temperature should not be less than 200° C. This relatively low melting temperature liquid metal is used as a safety factor in case the SPS is subject to a fire load. The pressure fit metal plug acts as a pressure relief valve and the liquid metal that filled the aperture in the plug melts upon the ambient temperature reaching the 250° C. to 300° C. range, thereby relieving any pressure that may build up within the core cavity. The apertures 70 are preferably on the inner plate 34 of the outer hull 28, away from exposure to the outside environment, and on the outer plate 36 of the inner hull 20, away from exposure to the cargo. Thus, the apertures 70 and plugs 72 are generally exposed to the void between the inner hull 20 and outer hull 28, where inspection and maintenance is readily possible.

Panels may be prefabricated with appropriate weld margins and assembled on site. The remaining cavities would then be injected with elastomer as described above. Some panels may be cast flat and then cold formed into curved panels. These curved panels would preferably be joined, by welding, to other panels in the normal manner, as known to those skilled in the art.

The component assembly process is repeated to complete installation of adjoining components as the vessel construction progresses. The assembly methods discussed herein are merely illustrative. Other methods of vessel assembly are known and are contemplated as being part of the present invention.

Because structural or adhesive characteristics of a selected elastomer may be damaged by the heat of welding, where adjacent composite components 18*a* and 18*b* are fastened by welding after the elastomer 38 is in place between the inner and outer plates, 34 and 36, a welding margin 58 must be provided. The welding margin 58 is a suitably dimensioned portion of the core cavity 56 proximal to a joint to be welded, which margin 58 is at least initially devoid of elastomer. Margin 58 is dimensioned so that the steel temperature is about 150° C. or below beyond this safety margin. Thus, depending upon the weld dimensions as a whole, margin 58 may vary. Margin 58, however, generally ranges from 20 mm to 200 mm, preferably from 50 mm to 100 mm and more preferably between 60 mm and 80 mm. A margin 58 of 75 mm from the joint being welded is most preferred to sufficiently prevent damage to the elastomer core 38. Steel temperatures 75 mm from a weld joint are generally about 150° C. while the temperature of the steel at or close to the weld joint is significantly higher. After completion of the welding operation, and after the joint has cooled sufficiently, for example, to 150° C., the void in the welding margin can be filled through apertures 70 provided for that purpose in the component inner and outer metal plates 34 and 36. Alternatively, the welding margin 58 of one component can be filled through the empty core cavity 56 of an adjacent component.

It is contemplated that an elastomer will be selected with bonding capabilities suitable for the metal of the inner and outer metal plates 34 and 36 or for primers that are applied to the steel to prevent corrosion during fabrication. Alternatively, suitable bonding agents can be used to promote adhesion, or adhesive can be used to bond the elastomer to the metal plates. The metal "skin" plates can also, by known means, be mechanically or chemically bonded to a pre-cast elastomer core. Spacers of an appropriate dimension may be placed between the "skin" plates to maintain the proper spacing during bonding operations.

Although a variety of materials are suitable and contemplated for the core of the steel-elastomer-steel composite panel, the preferred elastomer for the core of the composite panel is a thermoset polyurethane elastomer having appropriate chemical and physical properties. Specific details relating to elastomers may be found in Engineered Materials Handbook, Volume 2, Engineering Plastics (1988 ASM International) which is incorporated herein by reference. Thermoset polyurethane elastomer is an engineered material with, for example, the following range of physical properties and characteristics: tensile strength of 20 to 55 MPa, shore hardness of 70A to 80D, elongation of 100–800%, flexural modulus of 2 to 104 MPa, glass transition temperature of −70° C. to 15° C., abrasion resistance, low-temperature flexibility, low-temperature impact strength, long-term flexibility, tear/cut resistance, fuel and oil resistance, good elasticity and rebound, ozone resistance, weather resistance and temperature resistance. Other forms of polyurethane elastomers can be engineered to give physical properties outside the cited ranges that may be more suitable for a given application. These properties are temperature dependent. The selected elastomer must have physical properties that meet the specification for any given application over the anticipated range of temperatures and temperature history. For example, the temperature range for ship structures is between −45° C. and 100° C. and the glass transition temperature is between 60° C. and 90° C. These properties are defined and can be characterized in accordance with applicable ASTM standards.

Commercial applications of polyurethane elastomers include load bearing industrial rollers, caster wheels, exterior painted autobody parts, hydraulic seals, drive belts, injection/blow-molded dust shields, injection molded grease boots (covers), blow and flat die extruded film and sheet products (0.03 mm to 3 mm thick), tubing, hose covers, sport shoes, wire and cable protective covers. The properties and characteristics of commercially available polyurethane elastomers can be tailored for a particular application by varying the chemistry. Polyurethane elastomers have heretofore not been used in a composite sandwich with metal skins for containment vessels such as double hull oil tankers nor for other structural applications, such as bridge decks.

It is evident that the elastomeric core material of a structural composite panel 18 must adhere securely to both metal skin plates 34 and 36 in order to support operational loads. Furthermore, the cured elastomeric core material 38 must possess suitable structural characteristics, such as sufficient density, tensile strength, ductility, bond strength, shear strength and compressive strength to provide the composite panel 18 with the properties desirable in a ship building application, such as, for example, high strength and ductility, durability and impact resistance in accidental or extreme load events like groundings or collisions. The elastomer has a preferred modulus of elasticity (E) that ranges from, for example, generally 100 MPa to 2000 MPa, preferably from 200 MPa to 1200 MPa and more preferably from 250 MPa to 1000 MPa with a modulus of elasticity of greater than 200 MPa considered to be ideal to essentially prevent local buckling and decreases shear deformation under load. The elastomer has a tensile strength that ranges from about 5 MPa to about 75 MPa, a minimum elongation of about 20% at −45° C. (same as steel), a minimum bond strength over the entire operating temperature range (−45° C. to 100° C.) of about 0.1 Mpa, preferably from about 1.0 MPa to 10.0 MPa and, most preferably 4.0 Mpa. A currently preferred elastomer is ElastoCoat EC® 609-002/18, which is commercially available from Elastogran, a subsidiary of BASF, located in Olching, Germany. A properly formulated polyurethane elastomer possesses other suitable characteristics, such as water and oil resistance, thermal resistance for insulation, elasticity and rebound resilience for improved dampening characteristics and acoustical insulation.

The elastomer preferably has some air entrainment between 0% and 25%, more preferably between 0% and 15%, and most preferably between 3% and 7% to control polymerization shrinkage. Additional benefits include reduced weight and cost for the core material. Other gases or additions may be used to control polymerization shrinkage.

The elastomer core 38 of the composite panel 18 construction contributes in carrying the operating loads in several ways. First, the adhesion developed between the steel inner and outer plates 34 and 36 and the elastomer 38 prevents local buckling (e.g., face wrinkling, symmetric or asymmetric composite buckling) of the relatively thin metal plates 34 and 36, that would occur under normal hogging and sagging moments and eliminates the need for closely spaced longitudinal stiffeners between the longitudinal girders 22 or the need for closely spaced longitudinal girders 22. Second, the elastomer core 38 is provided with physical properties and in dimensions suitable to transfer sufficient shear between the inner and outer metal plates 34 and 36 to enhance the flexural strength of the inner and outer plates 34 and 36. The inner and outer plates 34 and 36 of the composite panel 18, because of their separation, provide approximately ten times more flexural strength and stiffness than that of conventional single metal plates 14 with the same total plate thickness and generally can be sized to achieve the plastic capacity of the face plates. As a result of the significantly higher strength of a composite component when compared to a corresponding single plate component, composite components such as, for example, longitudinal girders 22, frames 24 or bulkheads 26, can be spaced further apart and thus fewer are required. Furthermore, the stronger composite components require significantly fewer or no stiffeners 7. Therefore, without increasing the total weight of the steel required to build the vessel, steel normally used for the additional longitudinal girders 3, frames, 11 and 2, and plate stiffeners 7 required in prior art steel double hulls can be reallocated to the composite hull plates 17 and 18 and structural members such as girders 22, floors 24, bulkheads 26 and webs 32, to obtain stronger individual components capable of improved structural performance without increasing steel costs. The elastomer core 38 provides sufficient longitudinal shear transfer between the inner and outer metal plates 34 and 36 of the composite panel 18, to enable all of the plates 34 and 36 to contribute to the elastic section modulus and hence the moment resistance of the tanker as a whole. The elastomer increases the shear buckling capacity of the hull structure. By substituting the composite panel 18, constructed of two thinner steel plates 34 and 36 separated by and bonded to a structural elastomer 38, for the prior art single thicker steel plate, a tear or rupture resistant hull is achieved at a cost equivalent to or lower than conventional construction, since the steel plate may not have to be specified as a more costly notch tough steel. The distribution of the thickness of the two steel plates 34 and 36 in the composite panel 18 is not prescribed and can be distributed to optimize structural performance and durability for factors such as, for example, load bearing capacity, and corrosion and abrasion resistance.

The substitution of the composite panel 18 for conventional steel plate in the hull components, such as for example, hull panels 17, longitudinal girders floor frames 24 and bulkheads 26 significantly increases the strength of these individual hull components and the hull overall, and allows for a reduction in the thickness of the inner and outer steel plates 34 and 36 in the composite hull panels 18, and a significant reduction in the number of conventional hull construction components, such as stiffening elements 7, frames 11 and support members 2, 3 required to carry the in-plane service loads, such as, for example, the service loads that cause hogging and sagging. Substitution of the stronger composite panel 18 for conventional steel plates and for conventional frame and support members also simplifies the supporting structure. The stronger composite panels 18 allow construction with significantly fewer structural members, which in turn significantly reduces the number of structural intersections, such as, for example, longitudinals passing through floor frames 24, bulkheads 26, frame end brackets (not shown), tripping brackets (not shown), etc. The reduction in structural intersections in turn reduces the number of fatigue sensitive details and the corresponding number of fatigue failures that may occur. Fewer structural members also reduces the chances that a crack will propagate to the inner hull 20 in an accident situation.

The composite plate system combined with innovative naval architecture details provides an impact resistant tough structure. The outer steel plate 36 of the composite panel 18 acts as a hard protective wearing surface. The elastomer core 38 absorbs energy, dissipates transverse loads to the inner steel plate 34 and provides a continuous high elongation thermal resistant membrane. The inner steel plate 34 also serves as a hard protective wearing surface, and carries the majority of the impact load in inelastic membrane action. The sandwich concept allows for the optimum distribution of steel layer thicknesses between the outer and inner steel plates 34 and 36 of the composite panel 18 to provide the most efficient structural system. The thermal insulating properties of the elastomer core 38 provide a warmer environment to the inner steel plate 34 and supporting structural steel elements, such as longitudinal girders 22 and floor frames 24, allowing for the use of less costly lower fracture tough steel. In an accidental or extreme load condition, the ductile elastomer core 38 of the composite panel 18 increases the puncture resistance of the inner and outer metal plates 34 and 36, creates more uniform strain fields within the inner and outer metal plates 34 and 36 as they deform over supporting elements, such as longitudinal girders 22 and floor frames 24, decreases localized shear deformations, and, in the case of impact loads, greatly enhances the resistance of the inner and outer metal plates 34 and 36 to tearing at transverse support elements. This same behavior reduces localized bending strains at weld joints and improves the fatigue life. The elastomer core 38 within the inner hull 20 composite panel 18 provides an effective crack arrest layer between the outer hull 28, bottom or side structure that generally sustains damage during a collision or grounding, and the inner steel plates 34 of the inner hull 20 which line the cargo tanks. This crack arrest layer in conjunction with other crack arrest detailing will significantly reduce the likelihood of or even eliminate oil outflow that would occur from cracks propagating into the cargo tank from the rupture of the outer hull.

The simplified structural system is less congested, and with its flat surfaces, it is easier to apply, inspect and maintain protective coatings thereon. Coating breakdown is generally most common in areas which are difficult to access, such as the underside of flanges or flange web intersections (not shown), where the original coating application may be inadequate and subsequent coating maintenance applications are difficult. Because the composite panel system has less surface area to protect, there is a reduced probability of corrosion problems and an increased service life. The elastomer is an inert material and prohibits corrosion at the interface for sections where the plate has corroded through (e.g., by pitting corrosion) and protects the other steel face. The net structural strength of one face plate bonded to the elastomer core in combination with a bonded corroded steel plate is substantially greater than a single corroded steel plate. The bonded elastomer diminishes strain concentrations around corroded sections, thereby lessening the probability of the formation of fatigue cracks.

The initial cost to build the composite steel-elastomer-steel panel double hull structure is less than its traditional all-steel stiffened plate counterpart. The cost of the elastomer core material, installation and additional welding associated with the composite panels is offset by the elimination of a substantial number of conventional steel plate stiffeners 7, the elimination of support members, such as, for example, collar plates or compensating lugs at longitudinal transverse frame, floor or bulkhead intersections, and the elimination of substantial surface areas which in conventional hulls require painting and maintenance. Further cost benefits are realized in increased service life and lower liability and cargo insurance costs and lower operating costs that result from a lighter vessel and lower heating costs of oil during transit.

The fundamental reason for double hull oil tankers is to minimize the probability of oil outflow in the case of accidental or extreme load events such as grounding or collisions. In this regard, the inventive system provides superior performance to prior art designs.

Large scale grounding tests on prior art bottom hull sections indicate that rupture of the interior hull of current steel double hull alternatives will occur as a result of crack propagation from the initial rupture of the outside hull, even if the depth of penetration into the hull, by a rock or other object, is less than the separation distance between the inner and outer hulls. It becomes essential to isolate the cargo tank with a crack arresting protection layer 15. FIGS. 7–10 illustrate the interconnection of the composite hull plates 18 with the composite transverse bulkhead 26, the composite floor frame 24 and the composite longitudinal girder 22. The composite longitudinal girder 22 extends toward and connects with the composite floor frame 24 beneath the transverse bulkhead 26. The longitudinal edges of the longitudinal girder 22 are connected directly only to the inner plate 34 of the outer hull 28 and the outer plate 36 of the inner hull 20. The spacers 44 are arranged within the composite plate 18 of the inner hull 20 so that they are located midway between longitudinal girders 22. Referring to FIG. 8, a simple fillet weld 48 fastens edge 46 of the spacer 44 to the inner surface 66 of the outer plate 36 of the inner hull 20, and a single butt weld 55 fastens the edges 52 and 54 of inner hull inner plates 35a and 35b, respectively, and edge 50 of spacer 44, joining the respective plates of the composite panel 18. These simplified weld details are configured for ease of fabrication and to facilitate automation of welding operations. The placement of spacers 44 at mid distance between the longitudinal girders 22, in combination with the semi-circular clearance 60 in the floor frame 24 at the transverse bulkhead 26 adjacent to the location of the spacer 44 in the inner hull panel 20 provides an effective crack arrest barrier. FIGS. 8–10 clearly illustrate that the only direct, metal-to-metal contact between the inner metal layer 34 and the outer metal layer 36 of the inner hull 20 is the spacer 44. The inner hull 20 has effectively been isolated from crack propagation effects by placing spacer 44 at a significant distance from longitudinal girders 22, and by providing a clearance 60 in floor frame 24 proximal to the location of spacer 44 in the inner hull composite panel 18. Cracks propagating from the outer hull 28 up through the longitudinal girders 22 are stopped by the elastomer core 38 in the inner hull 20. Cracks propagating from the outer hull 28 up through floor frame 24, or other similar transverse structural members, terminate at clearance 60, effectively preventing the propagation of the crack through spacer 44 to the inner plate 34 of the inner hull 20. For other applications it may be possible to construct the composite structural panel without any metal to metal contact. In these cases, potential cracks are effectively terminated.

The semi-circular clearance 60 is a typical structural discontinuity that is used to terminate cracks in structures subject to crack propagation due to fatigue. A plug 62 fills the semi-circular clearance 60. The plug 62 has peripheral flanges 64 on either side of the floor frame 24 which create water tight compartments on either side. The plug may, for example, be a cast-in-place elastomer, although other types of plugs are contemplated. FIGS. 8, 9 and 10 clearly illustrate that the cargo tank 68 is effectively isolated, by means of the polyurethane elastomer core 38, from the outer ship structure, with the only direct metal-to-metal connection between the inner metal plate 34 of the inner hull 20 and the rest of the ship structure being the spacer elements 44 between inner and outer metal plates 34 and 36 shown in FIG. 8.

Figure 13:
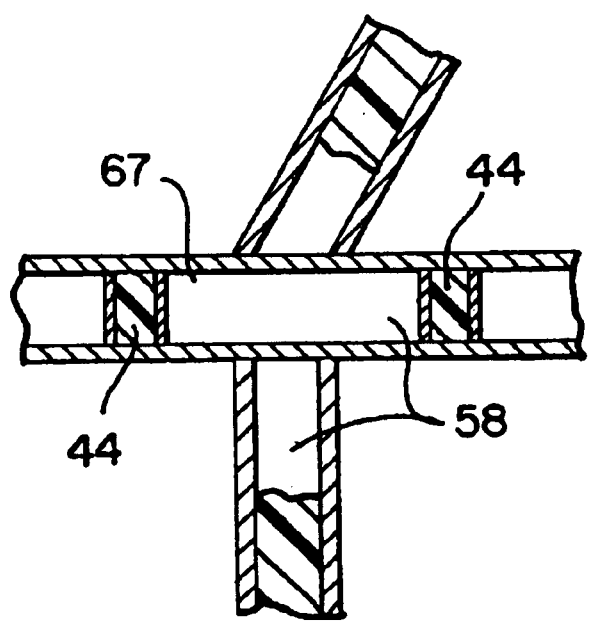
FIG. 13 is a cross-section view of the inner hull, bulkhead and composite spacer constructed with composite panels according to the present invention.

As illustrated in FIG. 9, the bulkhead 26 is fastened by welding or other means to the inner plate 34 of inner hull 20. Below the inner hull 20, floor frame 24 supports bulkhead 26 and is fastened by welding or other means to the outer plate 36 of inner hull 20. The elastomer layer 38 forms a crack arrest layer 15 between the floor frame 24 and the bulkhead 26. In order to ensure that there is no direct metal to metal contact between the inner plate 34 and the outer plate 36 of the inner hull 20, where the inner hull 20 passes between the floor frame 24 and the bulkhead 26, a gap 67 (FIG. 13) may be provided in the longitudinal spacer 44 (shown from a side view in FIG. 13) where it passes between the floor frame 24 and the bulkhead 26 and extending a short distance to either side of the transverse components as marked on page 20. Additional elastomer spacers may be placed transverse to the longitudinal spacers to provide a weld margin about the floor frame 24 and the bulkhead 26. Subsequent to welding gap 67 is filled with elastomer. Gap 67 is subsequently filled with elastomer. This effectively isolates the cargo tank from cracks propagating through the steel that may result from a collision of another vessel into the side structure of the hull.

In addition to innate crack arresting, the present invention also provides increased energy absorption capacity over that of CDH or ADH. The higher concentration of steel plate material in the hull plates coupled with the physical and behavior characteristics of the steel-elastomer-steel sandwich panel, such as increased section modulus and elastic rebounding properties of the elastomer, tend to spread local plasticity, e.g. decreases localized bending and shear strains around sharp or small load points, and with longitudinal girders that are designed to plastically deform (crumple) under accidental or extreme loads, will maximize the material deforming in plastic membrane action, maximize the material in contact with the object struck or striking object, delay the initiation of tearing and increase the energy absorption capacity. The result is a tough skin hull and an oil tanker with greater resistance to impact loads. To ensure survivability, the oil tanker is designed to maintain hull girder integrity after any probable accidental or extreme load event. The simplification of the structural arrangement reduces the number of intersections of perpendicular framing elements and the number of fatigue prone details.

As a result of providing the simplified structural system illustrated above, there is less surface area to be coated and protected from corrosion, and the surface area that does exist is predominantly flat and unobstructed. The application, inspection and maintenance of protective coatings is therefore easier. All of these factors work to reduce the initial construction costs, in-service maintenance costs and increase the potential service life of the vessel.

The thermal characteristics of the polyurethane elastomer may insulate the inner plate of the outside hull, the plates of the inside hull and the longitudinal girders from ambient temperatures such as, for example, oil tankers operating in cold weather regions, reducing the notch toughness requirements for the steel and the possibility of brittle fracture under impact loads. For the inside hull, this thermal insulation reduces in-service costs associated with heating of the oil cargo in transit.

The elastomer may be selected to be fuel and oil resistant, and impermeable to water. The selected elastomer should fully adhere to the steel plates to which it is cast. If properly selected, the elastomer will prevent the migration of water, fuel or oil between the inner and outer plates of either hull in the event where corrosion or abrasion causes a hole in any part of one of the hull plates. The composite steel structural plastic sandwich plate system can be used to provide tanks or containers that require liners to prevent corrosion of the container and/or contamination of the contents, such as, for example, edible oils. For example, stainless steel liners can be bonded to weldable structural steel to form structural sections that are able to carry the associated loads without welding, thus eliminating the problems and complexities associated with welding and joining dissimilar metals.

The inventive system has been designed to be constructable and cost competitive to build and to maintain.

Figure 15:
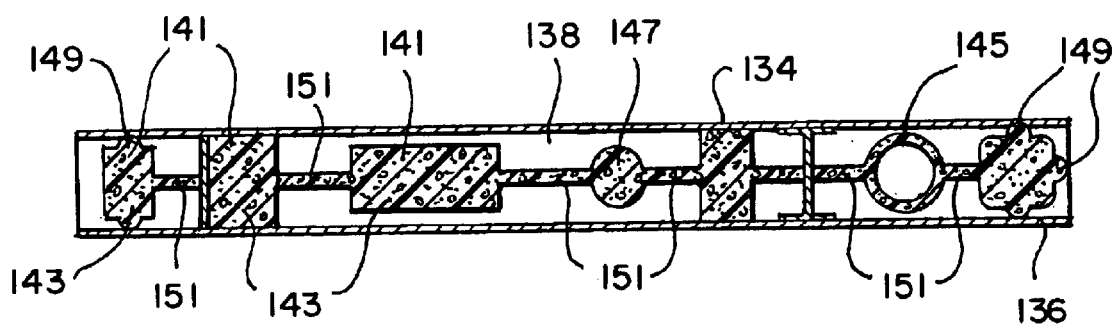
FIG. 15 is a cross-section view taken along line 15—15 of FIG. 14.
Figure 14:
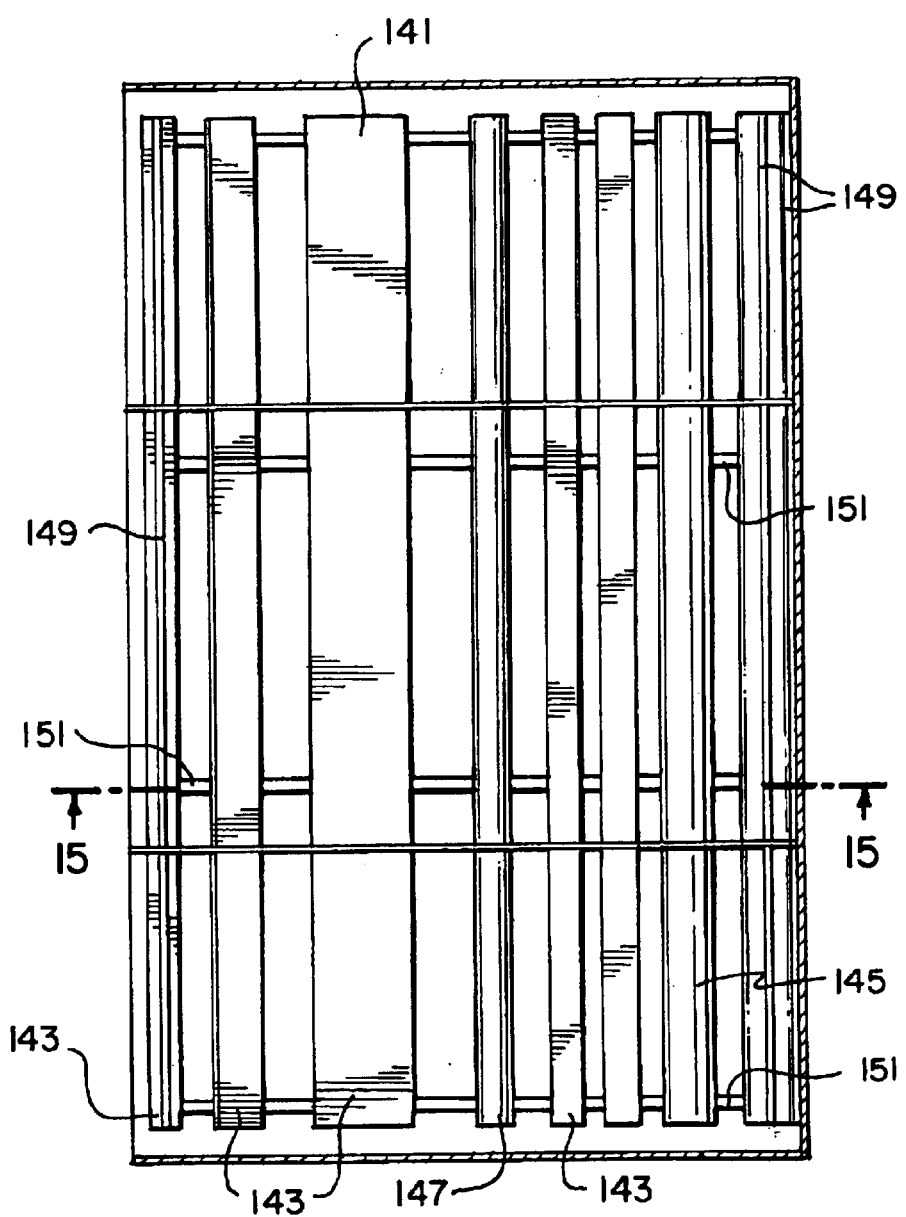
FIG. 14 is a plan view, with parts broken away, of another embodiment of a sandwich plate system according to the present invention.

Referring now to FIGS. 14–17, in accordance with the present invention, another embodiment of the sandwich plate system ("SPS") is composed of two metal face plates 134, 136, a structural plastic core 138 and rigid foam forms 141. The SPS section may be, for example, planar (as shown in FIGS. 14–16) or curvilinear (as shown in FIG. 17) in one or more directions, and it may have a variable thickness depending on the application. Rigid foam forms 141 are used to create voids in the structural plastic core. The system may be open (i.e., exposed core) or enclosed. The rigid foam forms may be of any number of a variety of different arrangements and shapes that are cast permanently in place. FIG. 15 shows the rigid foam forms in many various shapes. For example, the principal voids may be of different shapes (e.g., rectangular 143, circular 145, hexagonal, oval 147, circular annulus, or others) and may have dimples 149 located on either the horizontal or vertical surfaces to locate the void within the metal face plates. Annular voids may be used to pass services and wiring. In the case of passenger decks, the use of annular voids would allow for thinner unobstructed floor systems. The principal voids may be interconnected by small round hollow or solid tubes or solid sections 151. The number, size and shape of these may vary and are sufficient to provide rigidity to the unit and orient the rigid foam forms within the metal face plates. These interconnecting sections are generally, but not necessarily, perpendicular to the principal voids. FIG. 16 shows a planar SPS having circular-shaped interconnecting rigid foam forms 145. FIG. 17 shows a curvilinear SPS having circular-shaped interconnecting rigid foam forms 145. The rigid foam forms serve to:

provide dimensional accuracy (dimples) and location of the void form within the sandwich plate system provide dimensional accuracy for the face plates, provide a system for internal distribution of wiring or piping (hollow void forms), provide a system that locates the structural plastic core in the optimum location to give the required structural performance.

The rigid foam forms maybe cast for a specific purpose or constructed in a generic manner for specific thickness such that the forms could be sized (i.e., cut) to fit. The rigid foam forms has a density that ranges, for example, from 2 kg/m$^3$ to 800 kg/m$^3$, preferably from 10 kg/m$^3$ to 200 kg/m$^3$, and more preferably from 50 kg/m$^3$ to 100 kg/m$^3$.

The voided sandwich plate provides similar structural and construction benefits as the non-voided system. The elastomer has relatively good structural properties as compared to foam. But the use of foam reduces the weight and overall cost of the SPS. In other words, foam takes up space within the SPS at a relatively low cost while simultaneously reducing the weight of the SPS. The SPS is lighter and well suited to both maritime and civil applications where weight is a prime design parameter. Typical applications include decks of passenger vessels, barge side shell structures, and bridge decks. Welding between face plates can be minimized or even eliminated with this system provided that the bonded area between the elastomer and face plates is sufficient. In cases where the core material is exposed and where the welding is minimized, the core material must provide the additional required shear capacity between the plates and it must be resistant to the environment (hydrophobic, UV resistant, etc.). The core material must meet the appropriate specification for the intended function or use. For exposed cases the core may require additives to enhance its fire resistance.

Metal plates or rolled sections may be cast integrally with either the rigid foam form or with the elastomer between the face plates to provide additional shear and flexural stiffness where required. The location, size and number are dependent on the load and the structural requirements. The plates or sections may be oriented longitudinally or transversely or both. These sections need not be welded to the face plates. Shear transfer between the metal plates or sections and the face plates is provided through bond between the elastomer (primary) and foam (secondary) and the metal plates or sections.

The face plates may be of different metals which provide different functions like steel (inexpensive strength component), stainless steel (strength, resistant to various forms of contamination and chemical attack), and aluminum (light weight, relatively good stiffness and strength).

To produce this SPS variant, a rigid foam form 141 is first placed within the core cavity 156. In some cases, the internal steel elements may be cast as part of the rigid foam form. Thereafter, the core cavity is filled with elastomer 138 via apertures 170, in a manner as described above with respect to filling cavity 56 with elastomer 138.

Another application of the lightweight sandwich plate system ("SPS") is for liquid storage tanks that are generally thin walled metal structures. In one embodiment, the liquid is palm oil with tanks measuring I Om in height and 20m in diameter. The SPS would be used for the wall, base and top to provide insulation to the oil. The elastomer provides a connection between the outer metal layer (mild steel) and the inner metal layer (stainless steel) without having to contend with the problem of welding dissimilar metals. The construction allows for the reduction of the inner more expensive metal layer to relatively thin gauge sheets. These thin gauge sheets can be joined using existing technology like structural tape or laser welding.

The combination of the elastomer and foam form voids provides continuous support to the thin inner metal layer and additional bonding to reduce the reliance on the structural tape. The SPS provides a stiffer shell structure. The outer metal layer generally carries the hoop stresses. The elastomer and foam form core provide additional resistance to shell buckling at the base of the tank for circumstances where the tank is located in earthquake regions and may be subjected to these loads. The lightweight SPS sections could be curved and constructed on site or prefabricated in a mold and assembled on site. Some weld margins could be introduced for the joining of the outer metal layer by welding or other mechanical means (note, the elastomer can carry a portion of the hoop stresses, and depending on the loads may eliminate all welding). The inner layer would most likely be joined by structural tape.

The void forms may also be made of thin gauge steel or of some other material that can be suitably bonded to the elastomer and which may contribute to the structural performance.

Although a couple of embodiments that incorporate the teachings of the present invention have been shown and described herein, those skilled in the art can readily devise many other varied embodiment that incorporate these teachings, all of which are within the scope of the present invention.

What is claimed is:

1. A structural laminate member comprising:
   a first metal layer having a first inner surface and a first outer surface;
   a second metal layer having a second inner surface and a second outer surface, the second metal layer being spaced apart from the said first metal layer; and
   an intermediate layer comprised of a plastic material having a modulus of elasticity greater than 200 MPa, the plastic material located between and adhered to said first and second inner surfaces such that local buckling of the individual layers of the structural laminate member is prevented, wherein said intermediate layer further comprises a void form.

2. A structural laminate member according to claim 1, wherein said void form is made of polyurethane.

3. A structural laminate member according to claim 2, wherein said void form has a density in the range of 10 kg/m$^3$ to 200 kg/m$^3$.

4. A structural laminate member according to claim 1, wherein said void form is made of sheet steel.

5. A structural laminate member comprising:
   a first metal layer having a first inner surface, a first outer surface and a first thickness;
   a second metal layer having a second inner surface, a second outer surface and a second thickness, the second metal layer being spaced apart from the first metal layer; and
   an intermediate layer comprised of a plastic material having a modulus of elasticity greater than 200 MPa, the plastic material located between and adhered to said first and second inner surfaces, such that shear forces are transferred between said first and second metal layers so that the structural laminate member has a flexural strength greater than the flexural strength of a single metal layer with a thickness equal to the combined thicknesses of the first and second metal layers, wherein said intermediate layer further comprises a void form.

6. A structural laminate member according to claim 5, wherein said void form is made of sheet steel.

7. A structural laminate member according to claim 5, wherein said void form is made of polyurethane.

8. A structural laminate member according to claim 7, wherein said void form has a density in the range of 10 kg/m$^3$ to 200 kg/m$^3$.

9. A structural laminate member comprising:
   a first metal layer having a first inner surface and a first outer surface;
   a second metal layer having a second inner surface and a second outer surface, the second metal layer being spaced apart from the first metal layer; and
   an intermediate layer comprised of a plastic material having a modulus of elasticity greater than 200 MPa, the plastic material located between and adhered to said first and second inner surfaces such that, under load, energy is absorbed by the structural laminate member by a combination of strain dissipation, increased puncture resistance and inelastic membrane action of the laminate member, wherein said intermediate layer further comprises a void form.

10. A structural laminate member according to claim 9, wherein said void form is made of sheet steel.

11. A structural laminate member according to claim 9, wherein said void form is made of polyurethane.

12. A structural laminate member according to claim 11, wherein said void form has a density in the range of 10 kg/m³ to 200 kg/m³.

13. A structural laminate member comprising:
- a first metal layer having a first inner surface and a first outer surface;
- a second metal layer having a second inner surface and a second outer surface, the second metal layer being spaced apart from the first metal layer; and
- an intermediate layer comprised of a plastic material having a modulus of elasticity greater than 200 MPa, the plastic material located between and adhered to said first and second inner surfaces such that a crack formed in one of the first and second metal layers is prevented from propagating to the other of said first and second metal layers, wherein said intermediate layer further comprises a void form.

14. A structural laminate member according to claim 13, wherein said void form is made of sheet steel.

15. A structural laminate member according to claim 13, wherein said void form is made of polyurethane.

16. A structural laminate member according to claim 15, wherein said void form has a density in the range of 10 kg/m³ to 200 kg/m³.

* * * * *